United States Patent [19]

Urick et al.

[11] 4,276,689

[45] Jul. 7, 1981

[54] APPARATUS AND METHOD FOR AXIAL INSERTION OF DYNAMOELECTRIC MACHINE END TURN INSULATION

[75] Inventors: Palmer D. Urick, Decatur; Robert H. Bienz, Fort Wayne, both of Ind.

[73] Assignee: General Electric Company, Fort Wayne, Ind.

[21] Appl. No.: 27,370

[22] Filed: Apr. 5, 1979

[51] Int. Cl.³ .......................................... H02K 15/06
[52] U.S. Cl. ...................................... 29/596; 29/734; 29/736
[58] Field of Search ................. 29/596, 598, 606, 734, 29/736, 732; 310/214, 215, 42, 260, 270

[56] References Cited

U.S. PATENT DOCUMENTS

| | | | |
|---|---|---|---|
| 2,701,317 | 2/1955 | Herman | 310/215 |
| 2,998,540 | 8/1961 | Phillips | 310/214 |
| 3,402,462 | 9/1968 | Walker et al. | 29/596 |
| 3,439,205 | 4/1969 | Houtman | 310/180 |
| 3,689,976 | 9/1972 | Donovan | 29/736 |
| 3,694,887 | 10/1972 | Walker et al. | 29/596 X |
| 3,857,171 | 12/1974 | Lund | 29/596 |
| 4,047,293 | 9/1977 | Kieffer | 29/736 |
| 4,090,290 | 5/1978 | Clark | 29/734 X |

FOREIGN PATENT DOCUMENTS 1461126  1/1977  United Kingdom.

*Primary Examiner*—Carl E. Hall

*Attorney, Agent, or Firm*—Joseph E. Papin

[57] ABSTRACT

A preferred method proceeds with coil injection equipment having phase windings confined by axially extending gaps defined by the equipment tooling; positioning insulation retaining and shedding means within the tooling; and draping phase insulation with legs in some of the gaps. When the legs are ribbon type, the legs are twisted, i.e., angularly oriented so that they will enter core slots in edgewise fashion. The sheet-like end turn insulating portions are confined so that at least portions thereof establish a cylinder within the tooling. At least part of one leg is moved into a core slot by moving the core axially onto the tooling. After seating and clamping the core, the coil injection equipment is actuated, the phase insulation is shed into slots of the core, and windings are axially placed on the core. Preferred apparatus has a main drive rod that undergoes an initial increment of travel without corresponding movement of a wire stripper because of a lost motion connection. During the initial travel increment, the phase insulation is moved axially and stripped radially outwardly onto the core. Preferred apparatus also includes a compound blade alignment and insulation holding and stripping device, at least parts of which are formed of an elastomeric material, and parts of which constitute rigid phase insulation moving and stripping fingers. The device also preferably includes a cylindrical section sized to fit within the coil injection tooling.

39 Claims, 5 Drawing Figures

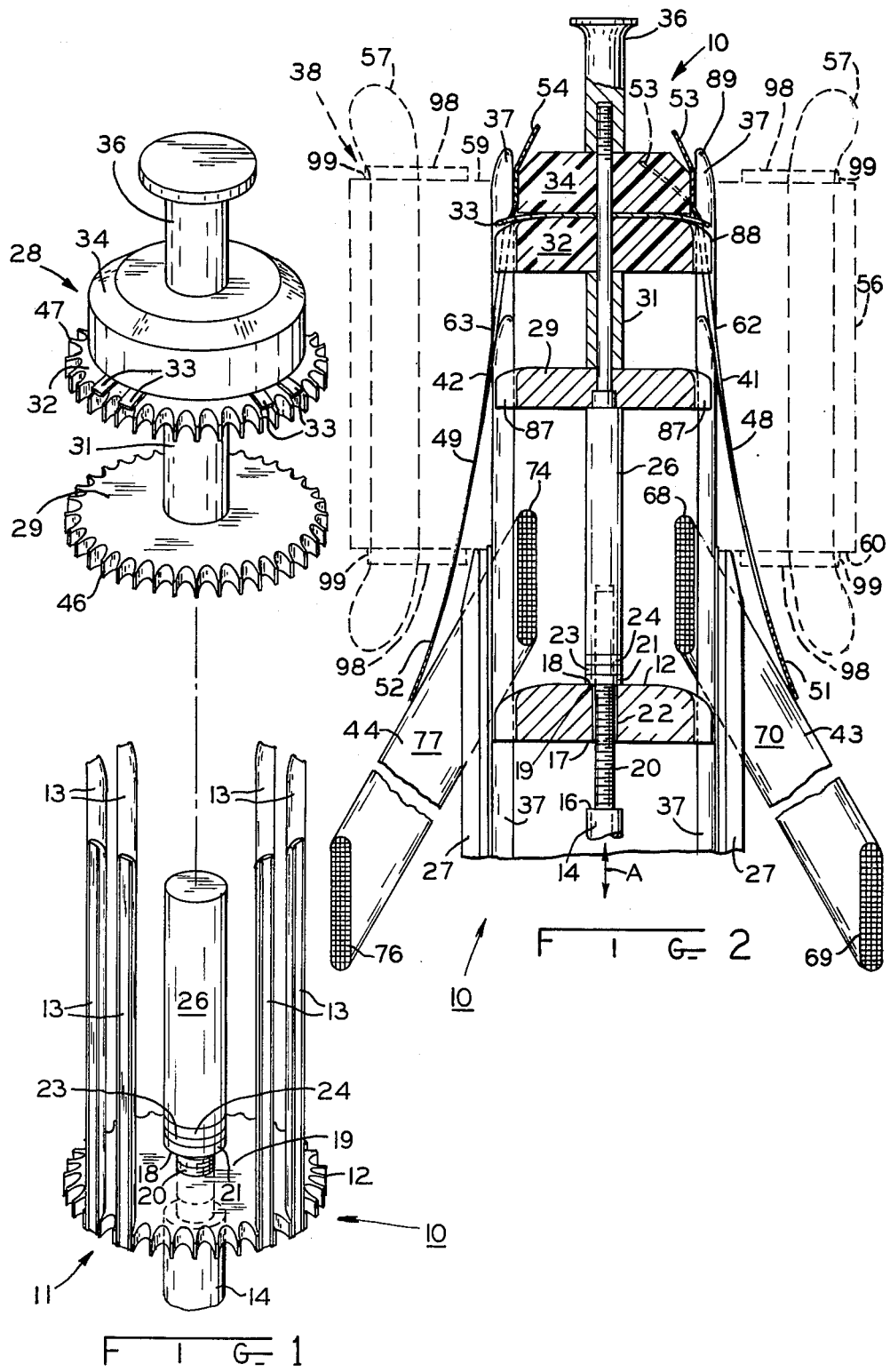

4,276,689

APPARATUS AND METHOD FOR AXIAL INSERTION OF DYNAMOELECTRIC MACHINE END TURN INSULATION

CROSS-REFERENCE TO RELATED APPLICATIONS

Co-pending application Ser. No. 918,055 which was filed on Feb. 25, 1977 in the name of Kindig and Miller; and Burns application Ser. No. 8,603 which was filed on Feb. 1, 1979; and both of which are assigned to the assignee of this application are directed to subject matter which in some respects is related to the subject matter of this application.

BACKGROUND OF THE INVENTION

This invention relates generally to improved processes and apparatus for positioning end turn insulation in stator assemblies made up of magnetic cores, two or more winding phases, and end turn insulation separating the end turn portions of different winding phases.

In the art, insulation which will be referred to herein as end turn insulation is also referred to as "phase insulation", "phase paper", "N-insulation", "ladder insulation", and "window insulation".

Historically, phase insulation has been manually positioned in slots of stator cores. This of course limits the productivity of motor manufacturers and contributes to higher costs for producing electric motors.

This problem has long been recognized in the art, and in addition to the solutions presented by the above-referenced related applications, others in the art have been attempting to develop still other solutions to the problem.

For example, as described in Lund U.S. Pat. No. 3,857,171 which issued Dec. 31, 1974; it is desirable to place insulation paper in the slots of magntic cores at substantially the same time that windings of the different winding phases are axially injected into the stator core slots. Clark U.S. Pat. No. 4,090,290 also recognizes the desirability of avoiding manual placement of individual insulators in the slots of magnetic cores. The approach suggested by Clark involves simultaneously transferring an end turn insulator and at least one winding coil from coil transfer tooling into the slots of stator cores. Some of the problems that have been encountered with the prior art approaches are also recognized, for example, in the United Kingdom Pat. No. 1,461,126 which was published Jan. 13, 1977 in the name of Droll.

The just-mentioned Lund, Clark and Droll patents all relate to the utilization of commonly available coil placing (i.e., coil injection) equipment. However, the illustration of such equipment is somewhat schematic in form in the above cited prior art. However, Walker et al. U.S. Pat. No. 3,402,462 which issued Sept. 24, 1968 contains rather good illustrations of coil placing equipment that is now well known in the art.

In attempting to follow the procedures taught in the prior art regarding machine placement of phase insulation by axially inserting the same with coil injection equipment, we have found that numerous other problems arise which prevent the utilization of such processes. Moreover, many of the problems remain whether conventional phase insulation stamped from flat sheet material is utilized or phase insulation is utilized as illustrated for example in the above-referenced Droll patent wherein the phase insulation is fabricated from filamentary material and flat strip material.

More specifically, as we have attempted to axially place phase insulation with coil injection equipment into the axially extending slots of stators (having bores in the neighborhood of five to five and one-half inches, and stack heights in the neighborhood of, for example, five to eight inches) the phase insulation would either be torn apart and destroyed or so severely mispositioned that more operator time was required to satisfactorily reposition the phase insulation than would have been required to manually place the phase insulation in the first instance.

Thus it should now be appreciated that it would be desirable to provide new and improved processes and apparatus for axially injecting phase insulation having legs that extend axially along axially extending slots of a dynamoelectric machine stator such that the phase insulation is neither so badly damaged as to be unusable, nor is so badly misplaced that any time savings associated with machine placement of the insulation is more than offset by the time consumed in manually repositioning mispositioned phase insulation.

Accordingly, it is a general object of the present invention to provide new and improved apparatus and methods for axially positioning leg portions of phase insulation in axially extending slots of stator cores by transferring such phase insulation from coil injection equipment into such slots in conjunction with operation of coil injection tooling being utilized for axially placing winding turns into the stator core slots.

It is another object of the present invention to provide new and improved apparatus and methods which fulfill the just-mentioned object and yet which may be carried into practice with conventional phase insulation having flat legs as well as phase insulation having filamentary type interconnecting legs.

It is still another object of the present invention to provide new and improved methods and apparatus for axially inserting phase insulation into a stator core in conjunction with a conventional coil placing procedure.

SUMMARY OF THE INVENTION

In carrying out the above and other objects, in one preferred form, we provide improved methods and apparatus that utilize, to a great extent, state of the art coil placing or coil injection equipment. In one preferred form of method, we proceed with coil injection equipment having phase windings confined by axially extending gaps defined by the tooling of such equipment. Thereafter, we position insulation retaining and shedding means within the coil injection tooling in spaced relation to the previously positioned phase windings. Thereupon, we drape phase insulation with interconnecting legs thereof positioned between gap defining members of the coil injection equipment. When the phase insulation being processed includes ribbon (as opposed to filamentary) type connecting legs, one of our procedural steps is to angularly orient the leading portion of such connecting legs so that they will be held in a position to enter the slots of a stator core in edgewise fashion. Moreover, we confine the actual end turn insulating portions of the insulation pieces so that they tend to establish a cylinder about the interior of the coil injection tooling. When the preferred step of draping the phase insulation is performed, an upper end portion of the insulation is positioned near the free end of the coil injection tooling. Thereafter, at least one leg of the phase insulation is moved at least part way into slots of a stator assembly by moving the stator assembly axially onto the tooling and along the previously positioned phase insulation draped thereon. After the core has been seated on the injection tooling, the core preferably is clamped in place, whereupon the coil injection equipment is actuated and the phase insulation is moved axially and shed into slots of the stator core just before the phase windings commence movement axially along the stator.

In one preferred form of apparatus which may be utilized to carry out the above-described method, conventional coil injection equipment is modified slightly so that a main drive rod which normally is used to move a wire stripper along the tooling undergoes an initial increment of travel without any corresponding movement of the conventional stripper. In other words, the power or drive member of the coil injection equipment is interconnected with the stripper with a lost motion connection. However, while the main drive rod is moving without corresponding movement of the wire stripper, the phase insulation is being moved axially along the bore of the stator and stripped radially outwardly to a final desired position on the stator assembly and into a desired spatial relationship with phase windings already carried by the stator core.

Apparatus of a preferred form for carrying out the above-described method includes a compound blade alignment and insulation holding and stripping device. In a preferred form, this device includes an assembly comprised of a blade aligning tool made of brass or other correspondingly hard and rigid material in order to maintain a desired alignment between adjacent gap defining blades of the coil injection equipment. Spaced from the blade alignment tool is another tool similarly shaped but formed of an elastomeric material. Immediately overlying the elastomeric stripper are a number of rigid phase insulation moving and stripping fingers. In addition, the device preferably includes a cylindrical section (which may also conveniently be produced from elastomeric material) which is sized to fit within the coil injection tooling with a clearance at least sufficient to confine part of the phase insulation pieces approximately in an axially extending semi-cylindrical configuration.

The subject matter which is regarded as our invention is either particularly pointed out or will become apparent and is distinctly claimed in the concluding portion of this specification. The invention itself, however, together with further objects and advantages thereof, may be best understood by reference to the following description taken in conjunction with the accompanying drawings wherein like reference numerals have been utilized to denote like parts throught the several views of the drawings.

BRIEF DESCRIPTION OF THE DRAWINGS

FIG. 1 is an exploded perspective view of parts of apparatus embodying the invention in one form and which may be utilized to practice the invention in another form thereof;

FIG. 2 is a side elevation, with parts removed, parts in phantom and parts in section of equipment embodying the invention in a preferred form and illustrating the completion of one of the steps of our preferred method;

DESCRIPTION OF THE PREFERRED EMBODIMENTS

Figure 3:
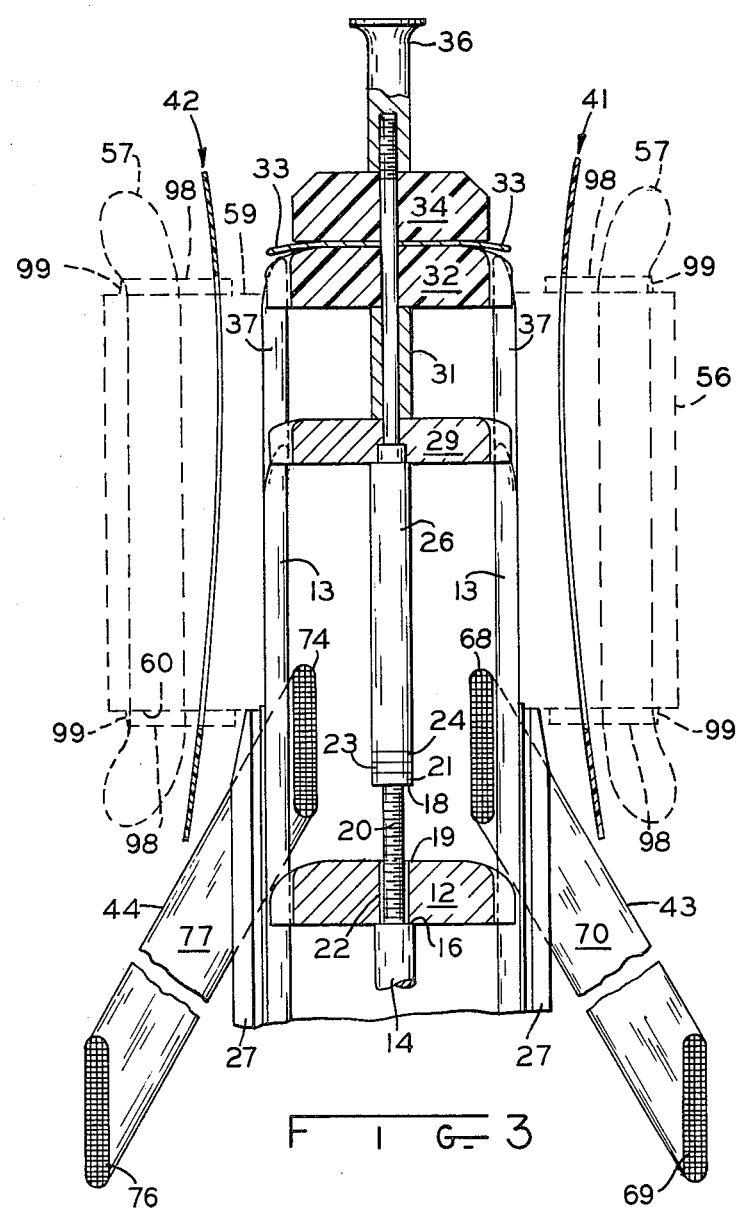
FIG. 3 is a view similar to FIG. 2 but wherein the relative position of the parts has been modified by reason of performance of one or more additional method steps.

With initial reference to FIGS. 1 and 2, a winding and insulation placing apparatus 10 has been illustrated which includes a conventional coil injection machine (not shown) as well as an assembly 11 made up of a wire stripper 12 and movable blades 13 which are carried by stripper 12 for movement therewith. The assembly 11 is movable axially as viewed in FIG. 2 as a result of reciprocal movement of a main drive rod 14 in the direction of arrow A (see FIG. 2). As will be appreciated from comparing both FIGS. 1 and 2, the main drive rod 14 includes an upper bearing surface 16 which is movable into engagement with a lower bearing surface 17 on the wire stripper 12. In addition, an upper bearing surface 18 is associated with the main drive rod 14 so that when the main drive rod 14 moves downwardly as viewed in FIG. 2, the bearing surface 18 will impinge against a corresponding bearing area 19 on the wire stripper 12 and cause downward movement of the stripper 12. Preferably, the rod 14 has a reduced diameter portion thereof threaded as indicated at 20, and such threaded portion is slidably or otherwise movably received through a central opening 22 in the wire stripper 12. Threaded onto the threaded portion 20 of the main drive rod are a plurality of spacers 23, 24, 26 which serve an important purpose as will be described in more detail hereinbelow. At this point it is noted, however, that the axial position of bearing surface 18 relative to surface 16 is adjustably determined by the extent to which the spacers are threaded onto rod 14. This of course determines the extent of lost motion between rod 14 and stripper 12. As a matter of information, we have found that a lost motion of one and one half inches (about 38 mm) is suitable when using the illustrated apparatus with cores having a stack height or axial core length of about five inches (about 127 mm) or more.

For ease of illustration, major portions of the conventional coil injection equipment have been broken away, but it is noted that conventional wedge guides 27 have been illustrated. As will be understood by persons of ordinary skill in the art, the wedge guides 27 are carried by a wedge guide housing (not shown) which in turn is supported on any suitable type of equipment. In the case of equipment that has been utilized to actually reduce the present invention to practice, coil injection equipment purchased from Industra Products, Inc. of Fort Wayne, Indiana was utilized. Equipment of that type is clearly revealed in the above-referenced Walker et al U.S. Pat. No. 3,402,462 and, accordingly, the entire disclosure of such Walker et al patent is incorporated herein by reference.

The apparatus thus far described is known in the art with the exception of the interrelationship between the reduced diameter threaded portion 20 of drive rod 14, the bearing surfaces 16, 17, 18, and 19, and the lost motion interconnection between drive rod 14 and stripper 12 which results because of these structural differences. Thus, when the parts of the equipment are in the relative positions shown in FIG. 2, the rod 14 will be in its lower-most position (as viewed in FIG. 2) and all of the various equipment parts will be in their "home" or rest positions. However, when the coil injection equipment is actuated; rod 14 will move upwardly, as viewed in FIG. 2, driving the spacers 21, 23, 24, and 26 upwardly, but during an initial increment of travel (determined by the initial spacing between bearing surfaces 16 and 17,) the wire stripper 12 will remain stationary. Then, when the bearing surface 16 of main drive rod 14 engages the bottom of stripper 12, stripper 12 will commence moving upwardly with continued movement of the main drive rod 14.

While practicing the present invention, it is only during this particular increment of travel of drive rod 14 without corresponding movement of disc 12 that phase insulation is shed and stripped into a desired final position on a stator core as discussed in greater detail hereinafter. The means which is utilized with the illustrated apparatus for carrying out the justmentioned insulation shedding and stripping action is an assembly 28 which includes; a blade alignment tool 29; a spacer 31; an upper blade alignment and insulation holding tool 32; eight (four pair) insulation pushing and stripping elements 33; a cylindrical section retainer 34 that serves as an insulation shaping and retaining means; and a handle 36 which may be of any desired shape or configuration.

Because of the function of various elements shown in FIG. 2 during the practice of one of our preferred methods, different parts thereof have different structural and physical characteristics. For example, the blade aligner 29 is utitlized to maintain uniform gap spacing between adjacent blades 37 of the coil injection tooling and thus the aligner 29 typically is formed of a hard metallic material, such as brass or the like for instance. Since spacer 31 is relied upon only for a spacing function, the spacer 31 may be formed of steel, brass, wood, hard plastic, or virtually any other material. Similarly, the handle 36 may be formed of virtually any suitable material since the purpose of handle 36 is to provide a means by which the assembly 28 may be manually manipulated during the practice of our methods.

The blade alignment and insulation holding tool 32, the cylindrical section retainer 34, and the insulation pushing and stripping elements 33, play an important part in satisfactory operation of the illustrated apparatus, and the materials from which these parts are fabricated are selected based upon characteristics suitable for satisfactory operation of the apparatus. The operation of these parts will be better appreciated by now referring to FIG. 5 in conjunction with FIGS. 1 and 2.

When preparing to practice one process in a preferred form thereof, coil injection equipment modified to have the above-described lost motion action but otherwise similar to that of the above-referenced Walker et al patent (or equipment as shown in Donovan U.S. Pat. No. 3,689,976) will have the parts thereof relatively positioned as indicated by FIG. 2. Thus, the main drive rod 14 will be in its lowermost position, and the stripper 12 will be positioned, as illustrated in FIG. 2, relative to the wedge guides 27 and fixed blades 37. At this time, the stator assembly 38, the assembly 28, between phase insulators 41, 42, and winding turns 43, 44 will be remote from the coil injection equipment. Then, in conjunction with practicing our preferred process, the winding turns 43, 44 are draped or otherwise positioned between preselected axially extending gaps of the tooling which are defined at least in part by the stationary or fixed tooling blades 37. Thereafter, the assembly 28 is positioned within the interior of the coil injection equipment with a plurality of teeth 46 of the blade alignment tool 29 positioned in the axially extending gaps of the tooling. When so positioned, it will be understood that the teeth 46 separate and maintain alignment of the fixed blades 37 and movable blades 13 (which as previously mentioned are attached to and movable with the stripper 12). Similarly, another plurality of teeth 47 of the blade alignment and insulation holding tool 32 are also positioned adjacent to axially extending blades 37 of the coil injection equipment, all as is clearly revealed by the relative positioning of parts in FIG. 2. It is to be understood that while the illustrated apparatus is of the type having blades movable with a stripper, our invention also obviously is just as easily practiced with equipment wherein all of the blades are fixed, or wherein some blades are movable, but independently of the stripper-as shown, for example, in Kieffer U.S. Pat. No. 4,047,293 which issued Sept. 13, 1977 and the entire disclosure of which is incorporated herein by reference.

After the assembly 28 has been positioned on the tooling, the insulators 41, 42 are draped or otherwise positioned or arranged on the tooling by following a routine that will be described in more detail hereinafter. At the time that the insulators 41, 42 are so draped on the tooling, the respective legs 48, 49 thereof extend at least somewhat axially along the axially extending blades 37 of the tooling, one opposite end turn insulating portion (e.g., portions 51, 52) of each insulator is positioned in the proximity of the previously draped winding turns, and second or other opposite end turn insulating portions 53, 54, are confined between the axially extending tooling blades and the cylindrical section retainer 34 of assembly 28 and thus constrained so that at least parts thereof at least approximately establish a cylindrical configuration as best revealed in FIG. 2. If the cylindrical section retainer 34 was not utilized, the end turn insulating portions 53, 54 would tend to be sent inwardly toward the center of the injection tooling as indicated, for example, by the imaginary dotted line position of end turn insulating portion 53 represented in FIG. 2. However, this type of orientation would not be preferred and in fact is objectionable because end turn insulating portions so positioned tend to be objectionably damaged during subsequent steps of our process and also fail to become positioned as desired at the end of the insulator placing process.

Continuing with the general sequence of events utilized in following our process, once the between phase insulators 41, 42 have been draped in position on the coil injection tooling, the stator assembly 38 which comprises, as will be understood, a magnetic core 56, previously positioned phase windings 57, and any suitable ground insulation system, is moved axially onto the coil injection tooling. At this time, the tooling portion of the coil injection equipment enters and moves axially along a centrally disposed bore formed in the core 56 and the axially extending blades 37 of the coil injection tooling mesh with and become aligned with the tips of teeth of the core which define the ends of axially extending slots that are in open communication with the bore. As will be understood, such slots extend axially along the stator core 56 between the opposite end faces 59, 60 thereof. Preferably, the core 56 is moved axially along the coil injection tooling until the bottom end face 60 thereof comes to rest on the tips of the wedge guides 27. Moreover, the openings of the axially extending slots along the stator bore are in aligned relationship with the gaps defined by the axially extending blades 37 of the coil injection tooling. These interrelationships between the blades 37 of the coil injection tooling and the stator core 56 itself are clearly revealed, for example, in FIG. 2 of the above-referenced Walker et al patent; FIG. 2 of the above-referenced Lund U.S. Pat. No. 3,857,171; as well as FIG. 5 of the above-referenced Donovan U.S. Pat. No. 3,689,976. Accordingly, in the interest of reducing the complexity of the drawings attached hereto, the reader is referred to the above-referenced patents, the entire disclosures of all of which are incorporated herein by reference.

During the time that the stator assembly 38 is being positioned on the coil injection tooling, the between phase insulators 41, 42 and the stator assembly undergo relative axial movement. Thus, the between phase insulators 41,42 are at least partly positioned and assembled with the core 56 by the time that the core is finally positioned on the coil injection equipment. Thus, as illustrated in FIG. 2, that portion of the leg or connector 48 of the insulator 41 which lies below (as viewed in FIG. 2) point 62 is already disposed within a slot of the stator core 56. Similarly, the portion of the leg 49 of insulator 42 which lies below (as viewed in FIG. 2) point 63 is also disposed within a slot of the stator core 56. In addition, parts of the end turn insulating portions 53, 54 are confined and retained in a generally cylindrical configuration within the region of the bore of the stator core 56. While the above-mentioned steps preferably are carried out by moving the stator assembly 38 with respect to the injection tooling, it is to be understood that the stator assembly may alternatively be held in position with respect to the tooling whereupon the coil injection tooling itself (or at least the portions thereof shown in FIG. 2) would be moved into position relative to the stator core within the scope of the invention so as to meet at least some of the objects thereof.

Figures 4, 5:
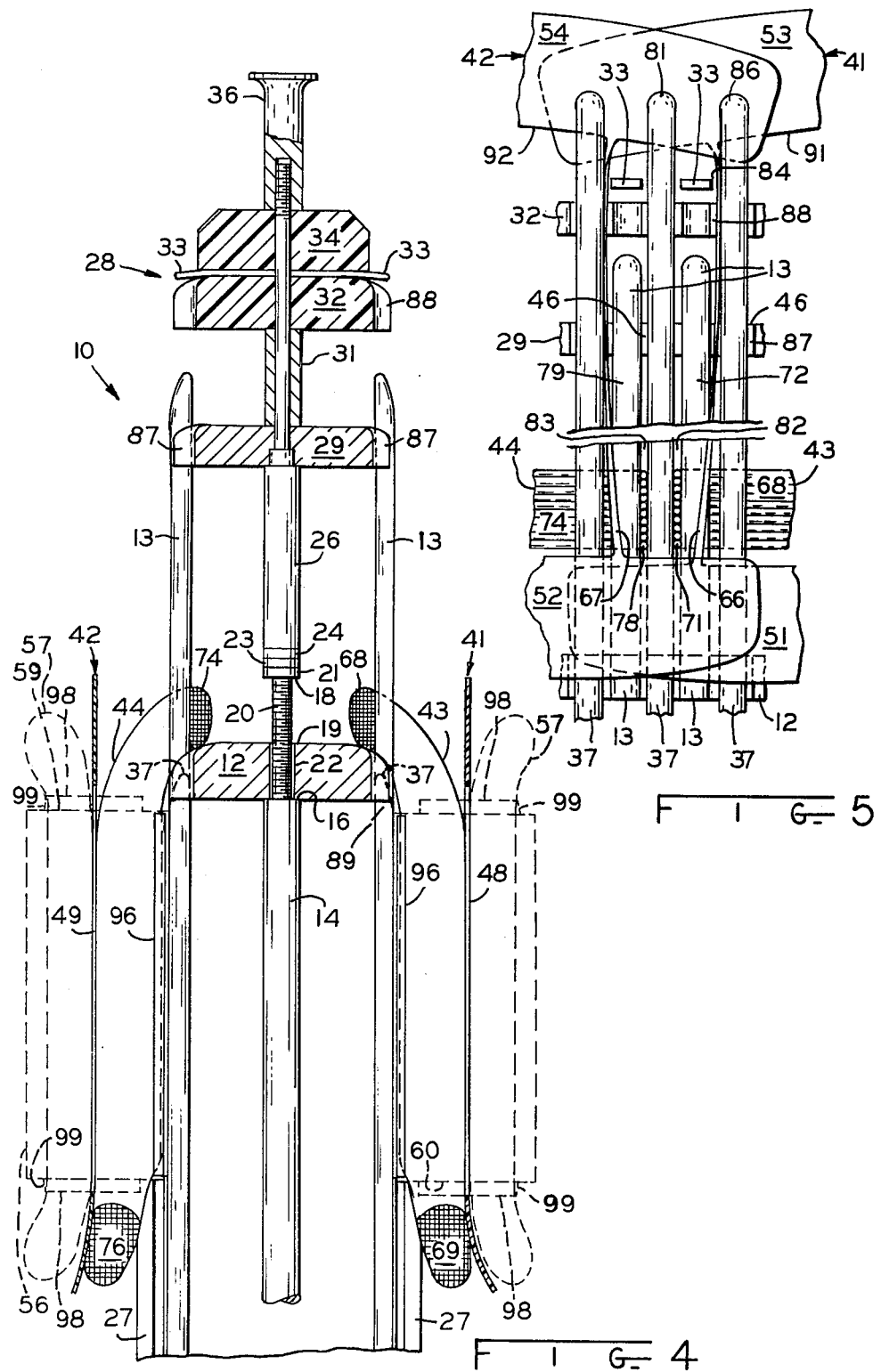
FIG. 4 is a view of the same apparatus and parts shown in FIGS. 2 and 3 but at a later point in time in the practice of our method.
FIG. 5 is a side elevation of part of the apparatus and material illustrated in FIG. 2.

With reference now to FIG. 5, the steps involving placement of the winding turns 43, 44 (see FIG. 2); the assembly 28; and the between phase insulators 41, 42 will be described in more detail. At the outset, it is noted that specific portions of apparatus shown in the front elevation of FIG. 5 are not visible in the sectional view of FIG. 2 except for segments of the end turn insulating portions 53, 54. Moreover, while the respective legs 48, 49 of the insulators 41, 42 are visible in FIG. 2, those legs are not seen in FIG. 5. However, the other leg 66 of insulator 41 and the other leg 67 of insulator 42 are revealed in FIG. 5.

It will be understood tht insulator 41 is comprised of the pair of opposite sheet like end turn insulating portions 51, 53 with the pair of spaced apart legs 66, 48 suitably interconnected therebetween. Similarly, the insulator 42 is comprised of the pair of opposite sheet like end turn insulating portions 52, 54 with the pair of spaced apart legs 67, 49 suitably interconnected therebetween. As will be understood by persons of ordinary skill in the art, the winding turns 43 include a first end turn portion 68, a second end turn portion 69, a first side turn portion 70 (see FIG. 2), and a second side turn portion 71. The juncture of the side turn portion 70 and the end turn portion 68 is disposed along an axially extending gap defined by a fixed blade 37 and a movable blade 13. Similarly, the junction between the side turn portion 71 and the end turn portion 68 is disposed between a movable blade 13 (which is also denoted by the reference numeral 72 in FIG. 5) and a fixed blade 37 (which has also been denoted by the reference numeral 81 in FIG. 5). Winding turns 44 also are made up of first and second end turn portions 74, 76 (see FIG. 2) and side turn portions 77 (see FIG. 2) and 78 (see FIG. 5). As will be understood, as viewed in FIG. 5, the juncture between the end turn portion 74 and the side turn portions 78 of the winding 34 is confined within the axially extending gap established between a movable blade 13 (which has also been denoted by the reference numeral 79) and a fixed blade 37 (which has also been denoted by the reference numeral 81).

With continuing reference to FIG. 5, once the windings have been draped in the appropriate axially extending gap (i.e., gaps 82, 83 in FIG. 5), the assembly 28 is positioned in the tooling as previously described. Thereafter, the phase insulator 41 is moved into the position thereof shown in FIG. 5 followed by placement of the phase insulator 42 (again as shown in FIG. 5). At this point, it should be noted that only two sets of winding turns, i.e., winding turns 43, 44 have been shown and described, and only two between phase insulators 41, 42 have been described. However, typically four between phase insulators are provided as well as four separate windings (assuming that four poles or "coil groups" of windings are being provided for a given motor).

The between phase insulator 41 is pulled into position by initially pulling part of the legs 48, 66 thereof between a respective one of pushing and stripping element 33 and an adjacent fixed blade 37, respectively. For example, the leg 66 is first pulled into a gap 84 defined by the aforementioned respective one pushing and stripping element 33 and the adjacent fixed blade 37 which has been denoted by the reference numeral 86. When this is done, the flat ribbon-like leg 66 is turned on edge and retained in edgewise fashion by being trapped between a respective one tooth 87 of tooth plurality 47 on tool 32 and the fixed blade 86. Similarly, as best seen in FIG. 2, the leg 48 of insulator 41 is trapped between a respective one tooth 88 of tooth plurality 47 on tool 32 and the fixed blade 37 which has been denoted by the reference numeral 89 in FIG. 2. Since the legs 66 and 48 are retained in their edgewise configuration (i.e., with the width dimension thereof extending generally radially from the center of the tooling as viewed in FIG. 2) only along the portions thereof that are trapped by a tooth 47 of the tool 32, the remainder of such legs tend to twist so that the portion thereof adjacent to the bottom end turn insulating portion 51 are oriented to lie flat with the end turn insulating portion 51 as viewed in FIG. 5.

The procedure that has just been described in connection with placement of the phase insulator 41 is also followed in connection with phase insulator 42 and the other phase insulators that are to be used in a given coil placing process. It is now noted that these same general procedures are followed when the legs or connectors are filamentary in nature (as taught in the above-referenced Droll patent or Burns application), although the "edgewise" terminology and orientation are not germane vis-a-vis round filamentary legs.

The entire tooling package as viewed in FIG. 2 normally is supported for indexing movement so that an operator may stand in front of the coil injection machine, position a first insulator 41, index the tooling 90° (when four equally circumferentially spaced insulators are to be used), and thereupon place or position a second phase insulator 42. This sequence, of course, is followed until the desired number of between phase insulators have been draped in the tooling.

The pushing and stripping elements 33 perform the function of bearing against the bottom edge of end turn insulating portions 53, 54, etc. during an injection cycle as discussed in greater detail hereinafter, and thus the pushing and stripping elements 33 typically are formed of steel and highly polished so that they will provide a minimum amount of friction against movement of the end turn insulating portions 53, 54 as they are being snapped radially outwardly into position on a stator core. On the other hand, the teeth 47 of the blade alignment and insulation holding tool 32 are relied upon to grasp and hold the insulation legs in their edgewise orientation (when the legs are flat, ribbon type) and yet should not inhibit placement of such legs between such teeth 47 and an adjacent tooling blade 37. Accordingly, it is preferred that at least the teeth 47 of the alignment and insulation holding tool 32 be formed of a durable yet resilient type of material. While the teeth 47 may be made from such material and attached to a holder, our preferred approach is to make the entire blade alignment and insulation holding tool 32 of a durable elastomeric material. In one actual reduction to practice, the blade alignment and insulation holding tool 32 as well as the cylindrical section retainer 34 were cast by utilizing a urethane casting system available commercially from the Dexter Corporation having an address at Franklin Street, Olean, N.Y., 14760 and marketed under the trade name HYSOL. As will be understood by persons of ordinary skill in the art, HYSOL urethane casting systems provide urethane elastomers which are flexible but tough, have good mechanical and abrasion resistance, and do not soften noticeably at elevated temperatures. In the reduction to practice just mentioned, we utilized a HYSOL resin designated as TU0590 and a HYSOL hardener designated as HD0146 by the Dexter Corporation. The resin and hardener were used in a proportion of 100 parts resin to 45 parts hardener, and such cured parts would typically exhibit a shore hardness of from D55 to D65.

It should be understood that the above description concerning the HYSOL material has been presented for purposes of exemplification only. Thus, other materials may be utilized with the recognition that preferably the material selected will have sufficient resiliency characteristics to permit the entrapment and retention of insulator connecting legs 48, 66 and 49, 67 between the teeth 87 47 of the insulation holding tool 32 and an adjacent coil injection blade 37.

It is again emphasized that although the description to this point has referred to insulators of the type having flat ribbon-like connecting legs, it may also be utilized with round filamentary type connecting legs as illustrated and described for example in the above mentioned and referenced patent documents. It also should be understood that the end turn insulating portions 53, 54, etc. of the insulators may be arranged in overlapping pinwheel fashion and confined between the somewhat resilient cylindrical section retainer 34 of assembly 28 and tooling blades 37. This pinwheel type of arrangement or configuration may also be better understood by reference to the above-referenced copending application Ser. No. 918,055 of Kindig and Miller, the entire disclosure of which is also incorporated herein by reference. When the overlapping pinwheel relationship of the insulator end turn insulating portions 53, 54 occurs in the tooling, a corresponding overlap pinwheel relationship will appear in stator core 56 after the insulators 41, 42 are positioned therein, a feature which is also disclosed and claimed in the above-referenced co-pending Kindig and Miller application.

It should now be understood that after the windings have been draped on the coil injection tooling, the assembly 28 is positioned thereover; and thereafter, the phase insulators 41, 42 are draped with the end turn insulating portions 51, 53 and 52, 54 thereof arranged in overlapping fashion around the cylindrical retainer 34 so that parts thereof are retained in a generally cylindrical configuration. Thereafter, the stator assembly 38 is moved into position on the stator tooling so that the various parts will have the relative positions thereof as illustrated in FIG. 2. Because of the entrapment of a segment of the connecting legs 48, 66 and 49, 67 of phase insulators 41, 42 between teeth 47 on tool 32 and adjacent tooling blades 37, the legs of the insulators readily enter the slot entrances of the stator core as such connecting legs and the stator core are moved axially relative to one another. Thus, by the time the lower end face 60 of the core approaches the points 62, 63 (see FIG. 2) of the connecting legs 48, 66 and 49, 67 of phase insulators 41, 42, the legs will be disposed well within the slots of the stator, and there will be no problems of the legs being trapped within the bore of the stator or popping out of the stator slots.

Once the parts are relatively positioned as shown in FIG. 2, the core 56 preferably is clamped and retained from moving; whereupon the main drive rod 14 is energized to move upwardly as shown in FIG. 2. As main rod 14 moves upwardly, the stripper 12 remains in a fixed position while the rod 14 starts driving the spacer 26 and assembly 28 upwardly. Movement of assembly 28 upwardly conjointly carries the phase insulators 41, 42 upwardly therewith. However, the phase insulators 41, 42 are dimensioned so that the connecting legs 48, 66 and 49, 67 thereof typically are only slightly longer than the axial length or stack height of the core. Thus, as the lower end turn insulating portions 51, 52 impinge against the lower face 60 of the stator core (or the cuffs of slot liner insulators), the connecting legs 48, 66 and 49, 67 seem to be forced to elongate slightly until the stripping elements 33 have elevated the upper end turn insulating portions 53, 54, etc. to a point where they can snap outwardly over the top of the fixed blades 37. The tips of the fixed blades 37 typically extend three quarters of an inch (19 mm) beyond the end face of the core. The interconnecting legs 48, 66 and 49, 67 of the insulators 41, 42 typically are about nine inches in length (228.6 mm) for use with a core having an axial height of eight and one quarter inches (209.6 mm) as shown in the drawings, and insulated with slot liners 98 having cuffs 99 that extend about three-sixteenths of an inch (4.8 mm) beyond each core end face 59, 60 so that the overall length from cuff to cuff is about eight and five eighths inches (219,1 mm). The cuffed slot liners 98 may also, as will be understood, replaced with an epoxy or other insulating coating applied directly to the core. In this event, the length of the insulator legs 48, 66 and 49, 67 would be reduced accordingly. Preferably, such elongation or deformation of the connecting legs 48, 66 and 49, 67 is elastic. Thus, as the upper end turn insulating portions 53, 54 clear the upper ends of the fixed blades 37, the lower insulator cuffs 99 will be deflected or compressed, and then the entire phase insulators 41, 42 pop or snap radially outwardly with the end turn insulating portions thereof positioned against the previously placed windings 57 and close to the end faces 59, 60 of the core (or the cuffs of the slot liners). With parts dimensioned as described above and with the free ends of blades 37 projecting three quarters of an inch (19.1 mm) beyond the core face, the vertical distance from the lower edge of an undistorted lower insulator cuff 99 to the top of a stripper element 33 just as an insulator is shed outwardly would be about nine and three sixteenths inches (233.4 mm). On the other hand, the vertical distance from the lower core face 60 to the top of elements 33 (level with the tips of blades 37 at the instant in question) would be nine inches (228.6 mm). It thus will be understood that with the phase insulator legs 48, 66 and 49, 67 dimensioned to be nine inches (228.6 mm), elastic deformation of either one or both the lower insulator cuffs 99 and the phase insulators 41, 42 will take place at least just prior to shedding of the phase insulators from the coil injection tooling.

The phase insulators 41, 42 and slot liners 98 may conveniently be made from the same material such as, e.g., polyethylene terephalate. When this type of material is purchased from E. I. DuPont de Nemours and Company under the brand name MYLAR, we use 0.075 of an inch (1.91 mm) thick material, and the same thickness material may be used to form the slot liners 98.

FIG. 3 illustrates the relative position of the various parts just after the lower edges 91, 92 of the end turn insulating portions 53, 54 have cleared and snapped over the free ends of the blades 37. At the point in time at which the illustrated apparatus and parts are in the relative positions shown in FIG. 3, the lower stripper 12 will have just commenced moving in order to place the windings 43, 44 in the slots of the stator core. However, at the instant in time that the stripper 12 initially commences to move upwardly (as viewed in FIGS. 2 and 3), the insulators 41, 42 will have already been shed from the tooling into the desired position on the stator core. This can be assured by utilizing spacers 26, 31 of appropriate length so that the upper insulator pushing edge of the pushing and stripping elements 33 are one and one half inches (about 37 mm) or slightly less from the upper extremity of the fixed blades 37 when the tool parts are in their initial "rest" positions. Thus, since the rod 14 must move one and one half inches (about 37 mm) before the stripper 12 will commence moving, the upper surface of the pushing and stripping elements 33 will have cleared the upper or free ends of the fixed tooling blades 37 and shed the end turn insulating portions 53, 54 etc. of the insulators outwardly before the stripper 12 actually starts to move.

With continued movement of rod 14 beyond the initial one and one half inch (37 mm) increment of travel, the stripper 12 will advance upwardly through the center of the bore of the stator and place the windings 43, 44 into the stator. The stripper 12 continues to move upwardly, carrying the movable blades 13 therewith until it reaches an upper limit of travel as depicted in FIG. 4.

During the upward movement of the stripper 12, wedge pushers (not shown) also will move upwardly to move wedges 96 into the slots of the stator to close the slots and prevent the side turn portions of the windings being injected from inadvertently popping out of the stator slots. Since the placement of insulating wedges 96 (also sometimes called slot closure wedges) is known in the art, further description thereof is not included herein. Once the drive rod 14 is moved to its uppermost position as indicated by FIG. 4, it then is retracted, and at that time, the assembly 28 will be lowered by gravity until it comes to rest on the end turn portions 68, 74. However, continued movement of rod 14 will draw the stripper 12 and movable blades in a reverse direction downwardly (as viewed in FIG. 4) through the bore of the core to the initial rest or starting position.

Thereafter, the assembly 28 is removed from the injection machine tools, the stator assembly 38 is removed from the coil injection tooling; and typically, the stator assembly is then moved over a bullet press (not shown) which is utilized to move the end turns 68, 74, etc. away from the stator bore.

When cores of different axial lengths are to receive windings and insulators from the equipment illustrated herein, spacers such as spacers 26, 31, etc. are replaced with appropriately dimensioned spacers, and the position or length of the tooling blades may be changed. However, we have found that the preferred initial increment of travel during the lost motion period is about one and one half inches (38.1 mm) regardless of core length. Thus, placement of any such core on the tooling actually places the phase insulation part way within the core slots and within about one and one half inches of its final position.

It should now be understood that we have provided a method of substantially simultaneously placing a plurality of between phase insulators on a stator assembly with axially extending insulator connectors disposed in axially extending core slots which open into the stator bore. Moreover, our preferred method includes confining at least part of end turn insulating portions of the insulators in at least an approximately cylindrical configuration within an imaginary cylinder extending generally coaxially with the bore; relatively moving the stator assembly and plurality of phase insulators and thereby causing relative axial movement of the confined end turn insulating portions of each of the insulators along the bore of the core and also thereby causing the legs or connectors of the insulators to enter slots of the cores and undergo relative axial movement along such slots. Thereupon, we cease further relative axial movement between the insulators and stator assembly while the leading ends of the insulators are moved radially outwardly from the region of the bore to respective positions more closely adjacent to the core end faces and winding end turn portions of phase windings previously end placed on the core. When the insulator connectors are formed of material that may be elastically deformed, the process includes the elastic deformation of such connecting portions followed by relaxation of the connecting portions as the leading end turn insulating parts of the insulators are moved radially outwardly relative to the bore. Moreover, this process may include the elastic deformation of slot liner cuffs.

After the insulators have been moved axially relative to the core and such relative axial movement has ceased, we then place another phase winding on the stator assembly by following conventional axial coil placing techniques by moving at least the side turn portions of such another phase winding axially relative to the core. This process may be carried essentially one or more times per stator assembly having a single phase split-phase winding motor, or two or more times for a three-phase winding motor.

When the connectors or legs of the phase insulators are formed of a flat ribbon-like material, the method also preferably includes orienting the leading portions of such connectors or legs edgewise so that the width thereof tends to be disposed along radial lines extending from the center of the tooling and/or stator bore. Moreover, whether the connectors are of the ribbon type or filamentary type, the leading portions thereof preferably are resiliently retained closely adjacent to elongated coil injection tooling members or blades.

Apparatus embodying the invention in preferred forms will be understood to include axially extending coil injection blades or tools, a coil stripper means, and drive means which are interconnected with a lost motion connection with the stripper means. The lost motion connection means (which may take any suitable form) is utilized so that an insulator holding, pushing, and stripping mechanism may be actuated by the drive means a sufficient distance to effect final placement of the insulators on a stator core before axial movement of the windings is initiated by the stripper means. This avoids the problem of trapping or pinching the trailing ends or portions of the phase insulators by the windings carried in the tooling and thus greatly diminishes the problems associated with tearing, pinching and undesirably placing phase insulators.

With the preferred apparatus, the coil injection drive rod thus is movable without corresponding movement of the wire stripper for an initial increment of travel while the phase insulation is moved axially along the bore of a stator and stripped radially outwardly to its final desired position. Moreover, the preferred apparatus includes a compound blade alignment and insulation holding and stripping device. This compound device or assembly includes an elastomeric stripper and insulation connector retaining means as well as a number of rigid phase insulation moving and stripping fingers. Moreover, it is preferred that the compound device include means for retaining the end turn insulating portions at the leading end of the insulator in a generally cylindrical configuration within an extension of the stator bore.

The above detailed description has included dimensions of parts to be used in the production of relatively large three-phase alternating current motors (i.e., motors iwth eight and one quarter inch (209.6 mm) stacks and five and one half inch (139.7 mm) bores. However, the invention clearly is usable in connection with the manufacture of motors that are either smaller or larger than this.

Thus, while in accordance with the patent statutes, we have described what at present are considered to be preferred and alternate embodiments of the invention, and preferred methods of practicing our invention, it will be obvious to those skilled in the art that numerous changes and modifications may be made therein without departing from the invention. Accordingly, it is aimed in the appended claims to cover all such equivalent variations as fall within the true spirit and scope of our invention.

What we claim as new and desire to secure by Letters Patent of the United States is:

1. A method of substantially simultaneously placing a plurality of between phase insulators on a stator assembly comprising a magnetic core having a pair of opposite end faces, a central bore therebetween, and a plurality of slots that open into the bore, and also having at least one phase winding supported on the core with side turn portions thereof disposed in at least some of the slots and end turn portions thereof disposed adjacent the opposite end faces of the core, wherein the phase insulators respectively include a pair of spaced apart end turn insulating portions interconnected by at least one leg extending therebetween, the method comprising the steps of: containing at least a part of one of the end turn insulating portions of the phase insulators in a generally cylindrical configuration; relatively moving the phase insulators and the core and thereby causing relative movement of the one end turn insulating portion of the phase insulators along the bore of the core and also thereby causing the at least one leg of the phase insulators to at least partially enter respective slots of the core and undergo relative movement along such respective slots; displacing the one end turn insulating portion of the phase insulators from the contained generally cylindrical configuration thereof in a direction generally radially outwardly from a general region of the bore into respective positions adjacent one of the opposite end faces of the core; and thereafter placing another phase winding on the core directly adjacent at least a part of at least one of the phase insulators.

2. The method as set forth in claim 1 wherein the displacing step includes moving the one end turn insulating portion of the phase insulators into respective positions adjacent winding end turn portions of the at least one phase winding supported on the core.

3. The method as set forth in claim 1 wherein the moving and causing step includes retaining the at least one leg of the phase insulators along at least one portion thereof in a position to assure alignment with and entry into the respective slot therefor in the core.

4. A method of placing at least two between phase insulators on a stator assembly comprising a magnetic core having end faces, an axially extending central bore, and a plurality of axially extending slots that open into the bore, wherein the at least two phase insulators include spaced apart end turn insulating portions interconnected by at least one leg extending therebetween, said method comprising the steps of: moving the stator assembly axially along the at least two phase insulators and thereby causing relative axial movement of first end turn insulating portions of the at least two phase insulators along the bore of the core and also thereby causing the legs of the insulators to enter slots of the core and undergo relative axial movement along such slots, confining at least a part of the first end turn insulating portions of the at least two phase insulators in a generally cylindrical configuration during at least a portion of the movement of the stator assembly along the at least two phase insulators, and placing a winding on the stator assembly by axially moving at least side turn portions of the winding axially relative to the core.

5. The method of claim 4 wherein the insulators and winding undergoes relative axial movement with respect to the core at the same time.

6. The method of claim 5 wherein the winding undergoes placement along slots of the core while the at least two insulators are being moved axially along the core.

7. A method of placing at least one between phase insulator on a stator assembly comprising a magnetic core having end faces, an axially extending central bore, and a plurality of axially extending slots that open into the bore, wherein the at least one phase insulator includes spaced apart end turn insulating portions interconnected by at least one leg extending therebetween, said method comprising the steps of: resiliently grasping the at least one leg along at least one portion thereof and aligning the grasped portion with an axially extending tool, thereby to assure subsequent alignment with and ease of entry into an axially extending core slot; relatively moving the stator assembly and the at least one phase insulator axially relative to the core and thereby causing relative axial movement of a first end turn insulating portion of the at least one phase insulator relative to the core and also thereby causing the portion of the at least one leg beyond the grasped portion thereof to enter a slot of the core and undergo relative axial movement along such slots; and subsequently causing further relative axial movement between the insulator and stator assembly and releasing the grasped portion of the leg and finally positioning the insulator in said core.

8. The method of claim 7 wherein axial coil injection apparatus is utilized in performance of the method, wherein the apparatus includes axially extending gap defining elements disposed about a circular path; a wire stripper; an insulation retaining, moving, and stripping device, and power means for moving the wire stripper and the device; and wherein the method further comprises: draping a winding in at least some of the axially extending gaps; placing the device within a central region defined by the gap defining elements; draping a plurality of phase insulator legs between preselected ones of the gap defining elements and resiliently grasping each of the legs along at least one portion thereof; moving the stator assembly axially along the gap defining elements with the slots of the core in alignment with the axially extending gaps; and thereafter moving the phase insulators fully into the core slots and moving portions of the winding into slots of the core.

9. A method of placing at least one between phase insulator on a stator assembly comprising a magnetic core having end faces, an axially extending central bore, and a plurality of axially extending slots that open into the bore, wherein the at least one phase insulator includes spaced apart end turn insulating portions interconnected by at least one flat ribbon type leg extending therebetween, said method comprising the steps of: orienting at least part of the at least one leg edgewise relative to the end turn insulating portions, and retaining such leg in such orientation; relatively moving the stator assembly and the at least one phase insulator axially relative to the core and thereby causing relative axial movement of a first end turn insulating portion of the at least one phase insulator with respect to the core, and also thereby causing the edgewise oriented portion of the at least one leg of the insulator to enter a slot of the core and undergo relative axial movement along such slot.

10. The method of claim 9 wherein axial coil injection apparatus is utilized in performance of the method, wherein the apparatus includes axially extending gap defining elements disposed about a circular path; a wire stripper; an insulation handling device, and power means for moving the wire stripper and the device; and wherein the method further comprises: draping a winding in at least some of the axially extending gaps; placing the device within a central region defined by the gap defining elements; draping a plurality of flat ribbon type phase insulator legs between preselected ones of the gap defining elements with a portion of each of the legs oriented edgewise with respect to an end turn insulating portion of a phase insulator; moving the stator assembly axially along the gap defining elements with the slots of the core in alignment with the axially extending gaps; and moving the phase insulator legs fully into the core slots and moving portions of the winding into slots of the core.

11. In coil injection apparatus of the type having axially extending gap defining members for receiving windings to be axially injected into axially extending slots of a stator core and further including means for placing between phase insulators in conjunction with a coil placing operation, the improvement wherein: said apparatus further includes means for holding at least parts of end turn insulating portions of the phase insulation in at least an approximately cylindrical configuration.

12. The invention of claim 11 wherein the apparatus further includes stripper means for moving wire axially into the slots of a stator core; means for moving phase insulators axially along a stator core; and lost motion drive means for imparting a motive force to the means for moving phase insulators before motive force is imparted to the wire stripper.

13. The invention of claim 11 wherein the apparatus further includes a plurality of resilient teeth for gripping portions of insulator legs extending between end turn insulating portions of phase insulators.

14. In coil injection apparatus of the type having axially extending gap defining members arranged around a central axis for receiving windings to be axially injected into axially extending slots of a stator core and further including means for placing between phase insulators in conjunction with a coil placing operation, the improvement wherein: said apparatus further includes means for holding at least parts of flat ribbon type legs of phase insulators with at least a portion of each such leg oriented edgewise so that the flat width of such portion extends generally radially from said central axis.

15. The invention of claim 14 wherein the apparatus includes insulation placing means in the form of smooth surfaced, rigid, generally radially directed elements.

16. The invention of claim 14 wherein the apparatus further includes a plurality of resilient teeth for gripping portions of the flat ribbon type legs.

17. The invention of claim 14 wherein the apparatus further includes stripper means for moving wire axially into the slots of a stator core; means for moving phase insulators axially along a stator core; and lost motion drive means for imparting driving motion to the means for moving phase insulators before motive power is imparted to the wire stripper.

18. In coil injection apparatus of the type having a plurality of axially extending gap defining members arranged about a circular path that establish axially extending gaps for receiving winding turns to be axially injected into axially extending slots of a dynamoelectric machine stator core; wire insertion means disposed within said gap defining members and having elements extending radially outwardly into at least selected ones of said axially extending gaps for moving winding turns therealong and into stator core slots; insulator placing means disposed within said gap defining members for shedding phase insulators from said apparatus and into core slots; and means for axially moving said wire insertion means and said insulator placing means axially along said gap defining members, the improvement wherein: said means for axially moving is interconnected with the wire insertion means with a lost motion connection whereby said means for axially moving is operative for moving the insulator placing means axially relative to the gap defining means a predetermined first increment of travel prior to moving the wire insertion means.

19. The apparatus of claim 18 wherein the wire insertion means includes a stripper having a plurality of axially extending gap defining members attached thereto for movement therewith.

20. The invention of claim 18 wherein the apparatus further includes means for holding at least parts of a plurality of phase insulators in at least an approximately cylindrical configuration.

21. The invention of claim 18 wherein the insulator placing means includes a device comprising a plurality of resilient members that extend in closely spaced relationships with at least some of the gap defining members.

22. The invention of claim 18 wherein the insulator placing means includes a plurality of finger elements having flattened surfaces for bearing against and moving end turn insulating portions of phase insulators.

23. A method of placing at least two between phase insulators on a stator comprising a magnetic core having end faces, an axially extending central bore, and a plurality of axially extending slots that open into the bore, wherein the at least two phase insulators include spaced apart end turn insulating portions interconnected by at least one leg extending therebetween, said method comprising the steps of: draping at least a part of the at least two phase insulators along axially extending members that at least partially define axially extending gaps; moving the stator axially along the axially extending members and the at least two phase insulators and thereby causing at least part of the legs of the insulators to enter slots of the core.

24. The method of claim 23 wherein movement of the stator along the axially extending members is arrested, and thereafter the method includes moving the insulators axially with respect to the core.

25. The invention of claim 24 wherein the method further comprises placing windings on the core after the at least part of the legs of the insulators have entered slots of the core.

26. A method of placing at least two between phase insulators on a magnetic core having end faces, an axially extending central bore, and a plurality of axially extending slots that open into the bore, wherein the at least two phase insulators include spaced apart winding end turn insulating portions interconnected by at least one leg extending therebetween, said method comprising: moving the stator assembly axially along the at least two phase insulators and thereby causing relative axial movement of first end turn insulating portions of the at least two phase insulators along the bore of the core and also thereby causing at least parts of the legs of the insulators to enter slots of the core and undergo relative axial movement along such slots, and confining at least a part of the first end turn insulating portions of the at least two phase insulators in a generally cylindrical configuration during at least a portion of the movement of the stator assembly along the at least two phase insulators.

27. The method of claim 26 further including placing a winding on the core after the at least parts of the legs of the insulators have entered slots of the core.

28. A method of placing a plurality of phase insulators made of electrically insulating material on a stator assembly comprising a magnetic core having end faces, an axially extending central bore, and a plurality of axially extending slots that open into the bore, and also having insulators supported in at least some of the slots with electrically insulating material cuffs extending axially from the core end faces, wherein the phase insulators include spaced apart end turn insulating portions interconnected by at least one electrically insulating material leg extending therebetween, said method comprising the steps of: relatively moving the stator assembly and a plurality of phase insulators axially relative to the core and thereby causing relative axial movement of a first end turn insulating portion of each of the phase insulators along the bore of the core and also thereby causing at least parts of the legs of the phase insulators to enter slots of the core and undergo relative axial movement along such slots and ultimately causing end turn insulating portions of the phase insulators to engage at least some of the cuffs; thereafter continuing relative axial movement of the core and phase insulators and thereby deforming insulating material and finally placing the phase insulators on the core.

29. The method of claim 28 wherein deforming insulating material includes deforming at least some of the insulating material cuffs.

30. The method of claim 29 wherein deforming insulating material includes elongating at least one phase insulator leg.

31. The method of claim 30 wherein the at least one phase insulator leg is elastically elongated.

32. The method of claim 28 wherein deforming insulating material includes elongating at least one phase insulator leg.

33. The invention of claim 28 wherein the method further comprises placing windings on the core after the at least parts of the legs of the phase insulators have entered slots of the core.

34. Coil injection apparatus for use in placing windings and phase insulators on slotted magnetic dynamoelectric machine cores, said apparatus including axially extending gap defining elements disposed about a circular path; a wire stripper; an insulation retaining, moving, and stripping device; means for moving said device thereby to at least partly place phase insulators on the core; and means for moving the wire stripper after movement of said device has been at least initiated.

35. A method of substantially simultaneously placing a plurality of between phase insulators on a stator assembly comprising a magnetic core having end faces, an axially extending central bore, and a plurality of axially extending slots that open into the bore, and also having at least one phase winding supported on the core with side turn portions thereof disposed in at least some of the slots and end turn portions thereof disposed adjacent the core end faces, wherein the phase insulators include spaced apart end turn insulating portions interconnected by at least one leg extending therebetween, said method comprising the steps of: relatively moving the stator assembly and a plurality of phase insulators axially relative to the core and thereby causing relative axial movement of a first end turn insulating portion of each of the phase insulators along the bore of the core and also thereby causing the legs of the insulators to enter slots of the core and undergo relative axial movement along such slots; ceasing further relative axial movement between the insulators and stator assembly and moving the first end turn insulating portions radially outwardly from the region of the bore to respective positions adjacent the core end face; confining at least a part of the end turn insulating portions of the phase insulators in a generally cylindrical configuration and retaining such approximately cylindrical configuration at least until cessation of the relative axial movement between the insulators and stator assembly; and thereafter placing another phase winding on the stator assembly by axially moving at least side turn portions of the another phase winding axially relative to the core.

36. A method of substantially simultaneously placing a plurality of between phase insulators on a stator assembly comprising a magnetic core having end faces, an axially extending central bore, and a plurality of axially extending slots that open into the bore, and also having at least one phase winding supported on the core with side turn portions thereof disposed in at least some of the slots and end turn portions thereof disposed adjacent the core end faces, wherein the phase insulators include spaced apart end turn insulating portions interconnected by at least one leg extending therebetween, said method comprising the steps of: relatively moving the stator assembly and a plurality of phase insulators axially relative to the core and thereby causing relative axial movement of a first end turn insulating portion of each of the phase insulators along the bore of the core and also thereby causing the legs of the insulators to enter slots of the core and undergo relative axial movement along such slots; resiliently retaining the legs along at least one portion thereof in a position to assure alignment with and ease of entry into an axially extending core slot; the legs being flat ribbon type elements and including orienting at least part of such legs edgewise relative to the first end turn insulating portions and resiliently retaining such legs and such orientation; ceasing further relative axial movement between the insulators and stator assembly and moving the first end turn insulating portions radially outwardly from the region of the bore to respective positions adjacent the core end face; and thereafter placing another phase winding on the stator assembly by axially moving at least side turn portions of the another phase winding axially relative to the core.

37. A method of substantially simultaneously placing a plurality of between phase insulators on a stator assembly comprising a magnetic core having end faces, an axially extending central bore, and a plurality of axially extending slots that open into the bore, and also having at least one phase winding supported on the core with side turn portions thereof disposed in at least some of the slots and end turn portions thereof disposed adjacent the core end faces, wherein the phase insulators include spaced apart end turn insulating portions interconnected by at least one leg extending therebetween, said method comprising the steps of: relatively moving the stator assembly and a plurality of phase insulators axially relative to the core and thereby causing relative axial movement of a first end turn insulating portion of each of the phase insulators along the bore of the core and also thereby causing the legs of the insulators to enter slots of the core and undergo relative axial movement along such slots; ceasing further relative axial movement between the insulators and stator assembly and moving the first end turn insulating portions radially outwardly from the region of the bore to respective positions adjacent the core end face; thereafter placing another phase winding on the stator assembly by axially moving at least side turn portions of the another phase winding axially relative to the core; axial coil injection apparatus being utilized in performance of said method wherein the apparatus includes axially extending gap defining elements disposed about a circular path, a wire stripper, an insulation retaining, moving and stripping device, and power means for moving the wire stripper and the device; and wherein said method further comprises: draping the another phase winding in at least some of the axially extending gaps; placing the device within a central region defined by the gap defining elements; draping phase insulator legs between preselected ones of the gap defining elements with the first end turn insulating portions spaced axially away from the another phase winding; moving the stator assembly axially along the gap defining elements with the slots of the core in alignment with the axially extending gaps; and thereby at least partially inserting the legs of the phase insulators into slots of the core; moving the phase insulators fully into the core slots with the first end turn insulating portions positioned in proximity to a face of the core; and applying motive power to the wire stripper stripping portions of the another phase winding into slots of the core.

38. A method of placing at least two between phase insulators on a stator assembly comprising a magnetic core having end faces, an axially extending central bore, and a plurality of axially extending slots that open into the bore, wherein the at least two phase insulators include spaced apart end turn insulating portions interconnected by at least one leg extending therebetween, said method comprising: relatively moving the stator assembly and the at least two phase insulators axially relative to the core and thereby causing relative axial movement of a first end turn insulating portion of the at least two phase insulators along the bore of the core and also thereby causing the at least one leg of the at least two insulators to enter slots of the core and undergo relative axial movement along such slots at substantially the same time; ceasing further relative axial movement between the at least two insulators and stator assembly and moving the first end turn insulating portions of the at least two insulators radially outwardly from the region of the bore to positions radially outward from the bore; confining at least a part of the end turn insulating portions of the at least two phase insulators in a generally cylindrical configuration and retaining such approximately cylindrical configuration at least until cessation of the relative axial movement between the insulators and stator assembly; and thereafter placing a phase winding on the stator assembly by axially moving at least side turn portions of the another phase winding axially relative to the core.

39. A method of placing at least two between phase insulators on a stator assembly comprising a magnetic core having end faces, an axially extending central bore, and a plurality of axially extending slots that open into the bore, wherein the at least two phase insulators include spaced apart end turn insulating portions interconnected by at least one leg extending therebetween, said method comprising the steps of: confining at least a part of first end turn insulating portions of the at least two phase insulators in a generally cylindrical configuration; moving the stator assembly axially along the at least two phase insulators and thereby causing relative axial movement of the first end turn insulating portions along the bore of the core and also thereby causing the legs of the insulators to enter slots of the core and undergo relative axial movement along such slots, the insulators and winding undergoing relative axial movement with respect to the core at the same time; and placing a winding on the stator assembly by axially moving at least side turn portions of the winding axially relative to the core; wherein after initial common relative axial movement of the at least two insulators and winding with respect to the core, relative movement between the winding and core ceases, and additional relative movement between the at least two insulators and the core is effected until the at least two insulators are fully placed on the core, and thereafter relative axial movement of the winding with respect to the core is again effected.

* * * * *